United States Patent [19]

Anand et al.

[11] 4,296,052
[45] Oct. 20, 1981

[54] METHOD OF FABRICATING HELIUM-TIGHT TUBESHEET FOR HOLLOW FIBER TYPE BATTERY CELLS

[75] Inventors: Joginder N. Anand, Clayton; Timothy T. Revak, Concord; Floris Y. Tsang, Walnut Creek, all of Calif.

[73] Assignee: The Dow Chemical Company, Midland, Mich.

[21] Appl. No.: 121,357

[22] Filed: Feb. 14, 1980

Related U.S. Application Data

[62] Division of Ser. No. 12,637, Feb. 16, 1979, Pat. No. 4,219,613.

[51] Int. Cl.³ .............................................. H05B 1/00
[52] U.S. Cl. ...................................... 264/25; 264/60; 264/332; 264/104
[58] Field of Search .................... 264/60, 25, 332, 104

[56] References Cited

U.S. PATENT DOCUMENTS

| | | | |
|---|---|---|---|
| 3,672,995 | 6/1972 | Brown et al. | 136/6 |
| 3,679,480 | 7/1972 | Brown et al. | 136/6 |
| 3,703,412 | 11/1972 | Levine | 136/6 |
| 3,749,603 | 7/1973 | Stringham et al. | 136/6 |
| 3,765,944 | 10/1973 | Taplin et al. | 136/83 R |
| 3,791,868 | 2/1974 | Compton et al. | 136/13 |
| 4,112,203 | 9/1978 | Anand | 429/104 |

*Primary Examiner*—James R. Hall
*Attorney, Agent, or Firm*—R. R. Stringham

[57] ABSTRACT

A ceramic tubesheet pierced by a plurality of hollow, glass fibers and consisting of sintered particles is rendered essentially impermeable by selectively fusing the portion of the tubesheet subjacent to and defining one of its surfaces. The fiber lengths extending from the opposite surface of the tubesheet are freer to flex and less likely to be broken than if the entire tubesheet were fused.

6 Claims, 1 Drawing Figure

METHOD OF FABRICATING HELIUM-TIGHT TUBESHEET FOR HOLLOW FIBER TYPE BATTERY CELLS

CROSS-REFERENCE TO RELATED APPLICATION

This is a divisional, of application Ser. No. 012,637 filed Feb. 16, 1979, now U.S. Pat. No. 4,219,613 issued Aug. 26, 1980.

BACKGROUND

Alkali-metal/chalcogen battery cells, such as sodium/sulfur cells, in which the electrolyte/separator/membrane takes the form of a large number of hollow fibers (capillary tubules) are now well known. See, for example, U.S. Pat. Nos. 3,476,062; 3,672,995; 3,679,480; 3,703,412; 3,749,603; 3,765,944; 3,791,868; 3,829,331; 3,917,490 and 4,050,915.

In a typical such sodium/sulfur cell, a body of molten sodium (the anolyte, on discharge) is disposed above an electronically non-conductive tubesheet and extends into (and fills) the tubules, which have their open end at the upper tubesheet surface. The tubules depend from the lower surface of the tubesheet and are immersed in a body of molten catholyte—a solution and/or mixture of sodium polysulfide in sulfur. When the cell is discharging through an external working circuit, elemental sodium gives up electrons to an anodic electron collector and forms Na+ ions which pass through the tubule walls into the catholyte. Sulfur in the catholyte takes up electrons at the cathodic current collector to form one polysulfide ($S_x^{2-}$) ion for every two Na+ ions formed.

It is highly important, in handling tubesheet/fiber assemblies, to avoid breaking off even one of the fibers, which are generally so small and so composed as to be fragile. It was conceived that the breakage tendency could be reduced if the flexure of the fiber, where it emerges from the bottom of the tubesheet, could be made less abrupt, i.e., could be distributed over a portion of the fiber length, rather than concentrated at the point of emergence. An ideal—but difficult to attain—improvement would be to have each fiber emerge from its own "well" (in the lower tubesheet surface) having the general shape of a trumpet bell. However, a further consideration is that a fluxing action of the tubesheet material on the fiber walls during densification (fusing) of the tubesheet apparently augments the tendency of the pendant fiber portions to break off, and this would not be eliminated by the latter improvement.

A modification which would appear to approach the ideal shape of the lower tubesheet surface and also to move the zone of fiber weakening up into the tubesheet body (where it is of much less concern) is to minimize the degree of contact between the fiber walls and a bottom portion (layer) of the tubesheet material. This might be done by utilizing a more open internal tubesheet structure but maintaining the essential impermeability of the tubesheet and sealingly engaging it with the fibers then become problems.

OBJECTS OF THE INVENTION

It is a principle object of the present invention to effect an improvement in tubesheet/hollow fiber assemblies whereby the tendency of the fibers to break off is reduced but the essential impermeability of the assembly is retained.

Another primary object is to provide a relatively simple, straight forward and easily controlled process for fabricating the improved assembly.

A further object is to reduce the necessity for plugging, or otherwise remedying, broken fiber ends in completed tubesheet/fiber assemblies.

An additional object is to effect the foregoing improvement in tubesheet/fiber assemblies without departing from the use of tubesheet materials already proven to be suitable (as to coefficient of expansion match with the fibers, strength, melting point, etc.).

Still other objects will be made apparent to those skilled in the art by the following specifications and claims.

SUMMARY OF THE INVENTION

It has now been discovered that the foregoing objects can be attained by modifying the internal structure of the tubesheet so that it has a closed (helium-tight) upper surface but the underlying structure is more open or porous than prior art tubesheets. This is done by "broiling" the uppermost layer of a tubesheet-to-be which consists essentially of sintered (edge and/or point-bonded) particles.

More precisely, the article (assembly) of the present invention may be described as:

a helium-tight tubesheet/fiber assembly comprising a ceramic tubesheet which has first and second generally opposed faces and is pierced by a plurality of inorganic hollow fibers having closed-ended sections extending from and first face and open ends terminating in or beyond said second face, the portion of said tubesheet subjacent to and defining said second face being non-porous and sealingly engaged with the fibers, the remainder of the tubesheet being contiguous with said portion but not itself sealingly engaged with the fibers, and consisting essentially of sintered particles having the same chemical composition as said portion, and the coefficient of thermal expansion of said ceramic material differing from the coefficient for the fiber material by not more than $20 \times 10^{-7}/°C$.

DEFINITIONS

Certain of the terms employed in the foregoing description are defined as follows for the purposes of the present application:

"Ceramic"—in accordance with the broadest meaning given for the term in Webster's Unabridged Dictionary, 2d. edition; i.e., products made from earth (sand, clay, metal oxides, etc.) by the agency of heat, such as glass and enamels, for example.

"Non-porous"—having a closed surface, i.e.,—a surface which has no openings connected to channels through which a fluid may flow; intended to include closed-cell foam structures. "Helium-tight"—having an internal structure such that less than $10^{-9}$ cc. of helium (measured at standard conditions) can diffuse through the tubesheet per second. It should be noted that the rate is an absolute rate and is not expressed in terms of volume of helium (per unit of time) per unit of area; the helium passes through the tubesheet only by way of leaks, at a rate independent of tubesheet area (diameter).

"Inorganic hollow fiber"—a capillary tubule having an outer diameter of about 6500 microns or less and consisting of an inorganic material. Intended to include graphite, ceramics or any other such high-melting material having a comparably low heat conductivity. For the purposes of the present application, such fibers are considered fragile if they have the character of ordinary glass, that is—if they cannot be sharply flexed without breaking.

A preferred assembly of the present invention is one in which the recited tubesheet is the only tubesheet comprised in the assembly. However, the invention is not limited to single tubesheet assemblies. That is, the closed ended sections of the fibers may penetrate into or pass through a second tubesheet which is spaced apart from the first and is not necessarily sealingly engaged with the fibers or otherwise identical to the first tubesheet. When the fibers terminate within the second tubesheet, their ends therein may be "closed" by forming a helium-tight seal between them and the surrounding tubesheet material. If the closed ends of the fibers extend beyond the second tubesheet, they may later be cut off to adapt the assembly for a use which requires the portions of the fibers between the tubesheets to be unbroken and at least the first tubesheet to be helium-tight.

The method of the present invention may be more precisely defined as:

a process for making a helium-tight, tubesheet/hollow fiber assembly comprising a ceramic tubesheet which has first and second generally opposed faces and is pierced by a plurality of inorganic hollow fibers having closed-ended sections extending from said first face and open ends terminating in or beyond said second face, the portion of said tubesheet subjacent to and defining said second face being non-porous and sealingly engaged with the fibers, the remainder of the tubesheet being contiguous with said portion but not itself sealingly engaged with the fibers, and consisting essentially of sintered, ceramic particles having the same chemical composition as said portion;

said process comprising:
(a) providing a self-supporting, sintered, ceramic particle mass which has two generally opposed surfaces and is pierced by and adhered to said fibers, the closed-ended sections of which extend from one of said surfaces and the open ends of which terminate in or beyond said other surface,
the particles constituting said mass consisting of a material which
  (1) has a coefficient of thermal expansion not differing from the coefficient for the fiber material by more than $20 \times 10^{-7}$ per °C.,
  (2) is fusible, at a temperature below the softening point of the fibers, to a melt capable of bonding with them, and
  (3) has a sufficiently low thermal conductivity so that the portion of said mass subjacent to and defining said other surface can be locally heated to said temperature and melted without causing the rest of said mass to lose its sintered, particulate structure,
(b) so heating to said temperature said portion of said mass, and
(c) cooling the so-heated mass to solidify the resulting layer of molten ceramic,
thereby forming said helium-tight assembly.

In a preferred embodiment of the foregoing process invention, the fiber-pierced, sintered ceramic particle mass is first formed as a "green cured", unsintered, shaped particle mass and then sintered at a temperature below the softening point of the fibers. The sintered mass is then treated as above to form the fused, impervious upper layer of the tubesheet.

The green-cured tubesheet may be formed from a slurry of ceramic particles of appropriate size distribution, shape and surface character with a suitable, volatile solvent, in appropriate proportions, such that the slurry is a paste capable of supporting itself in the form of a tubesheet (disc), when shaped as such. See, for example, U.S. Pat. No. 3,917,490. The slurry may also comprise a surface-active material.

The present invention is particularly of interest with regard to utilization, in alkali metal/chalcogen battery cells, of hollow fibers having alkali metal cation-permeable walls. At present, the most important known application is in fabricating hollow fiber type sodium/sulfur cells, i.e., battery cells in which the electrolyte/separator takes the form of hollow fibers having walls permeable to $Na^+$ ions. In the latter applications, the tubesheet material of course must not conduct electrons, i.e., must be electronically non-conductive.

DETAILED DESCRIPTION

Figure 1:
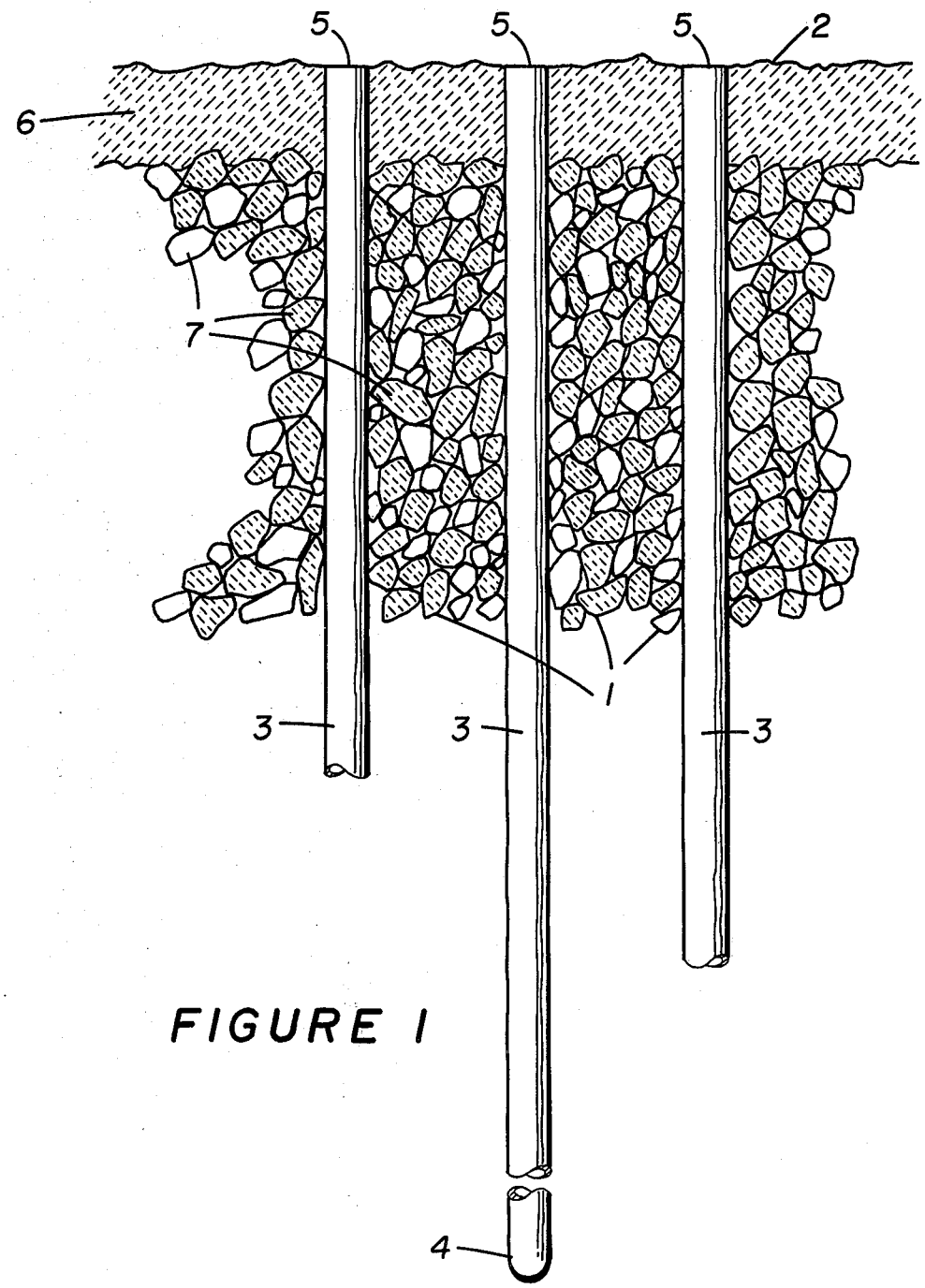

The following procedure has been employed for the fabrication of hollow fiber/tubesheet assemblies essentially of the type described in the U.S. patents enumerated earlier herein. Such assemblies include a cathodic current collector which is a metallic foil (or screen) disposed as generally concentric wraps between "rows" of vertical fibers. The steps of this procedure involving heating of the tubesheet constitute the nearest prior art known of with respect to the present invention. (Fiber/tubesheet (and foil) assemblies of improved resistance to fiber breakage are obtained if the heating step (e) is modified according to the present invention.)

(a) Hollow glass fibers are melt-spun, essentially as described in the above cited '915 patent. These are used to make long "ladders" in which two or more parellel, spacedapart, thin, narrow, flexible foil strips are "rails" and cut lengths of fiber, open at one end and sealed shut at the other end, and laid at right angles across the strips, constitute "rungs". The fiber lengths are held in place on each strip by a thin layer of a thermally-degradeable or "fugitive" cement such as ordinary rubber cement thinned with methylene chloride, for example.

A length of electrically conductive sheeting, such as a wide ribbon of aluminum foil, is coated with carbon or $MoS_2$ as described in the above cited '944 or '603 patent, respectively. The ribbon is wider than a fiber length and has a thickness equal to from about 0.1 to 0.2 of the outer diameter of a fiber. It is positioned with respect to the fiber ladder so that, when they are rolled up together, the open ends of the fibers will extend beyond one lateral edge of the foil and the portion of the foil adjacent to the other edge will extend beyond the closed ends of the fibers as a "skirt".

A flexible, conductive spacer tape, having a thickness at least equal to 1.1 fiber diameters, is provided, the width of the tape being somewhat less than the width of the foil skirt. This tape will usually be longer than the foil, to provide a tape end or tab that can later be used to form a connection to the casing bottom.

(b) The fiber ladder, foil and tape are rolled up together around a length of aluminum or stainless steel tubing (a mandrel) which is longer than the foil is wide and protrudes at one end of the developing roll. The tape is disposed in the roll so that one edge generally coincides with the skirt edge, thereby ensuring that the closed fiber ends are spaced apart from the other tape edge. At a later stage in the procedure, the protruding portion of the mandrel is cut off and the remainder of the tubing length then constitutes a central core around which the portion of the assembly below the tubesheet is disposed.

A bead of paste—a viscous suspension of glass or ceramic particles in a fugitive medium (see the above cited '490 patent)—is applied to the fibers, adjacent their open ends, as they enter the nip of the developing roll. The successive spirals of the latter bead laterally cohere in the completed "jelly roll" to form a self-supporting disc which will constitute the tubesheet, when densified (cured).

The outermost wrap of the foil may be adhered at its end to the nearest underlying wrap by a thin layer of a suitable cement (such as the above described rubber cement) to form a sleeve which serves to protect the subjacent fibers during subsequent handling.

(c) The tubesheet-to-be is "green cured" by placing the assembly comprising it in a sealed container and providing a means of condensing or absorbing the solvent vapors evolved from the cement(s) and the paste. In this way, the rate of drying is limited and the resulting green-cured disc is chalk-like and can be readily cut. Molecular sieves are a convenient means for absorbing the evolved vapors.

(d) If it is necessary to grind the edges of the disc, as to shape or size it, the protruding mandrel end can be used to hole the sub-assembly in a jig or chuck. It should be noted that it is considered generally advisable that care be taken to prevent uptake of moisture by the green-cured disc; such tubesheet compositions (see the above cited '331 patent) are considered hygroscopic.

(e) The green-cured disc is next "fired" or cured by heating the assembly to degrade and/or remove the cement components and any remaining suspension medium and to fuse together the glass or ceramic particles in the disc to form a densified, unitary tubesheet member with which the fiber portions passing through it are bonded in sealing engagement. This is done by supporting the assembly at the tubesheet periphery in an open pyrex container, which in turn is fitted closely within a closed metal casing, connecting the casing to a vacuum pump and placing the casing (and contents) in a furnace. The disc is heated, essentially by irradiation from and through the pyrex container, to a temperature of about 340° C. and kept at that temperature for about 2 hours. It is next further heated in the same manner, for about 4 hours at a final temperature which is about 15° above the glass transition temperature of the tubesheet material but well below the softening temperature of the fiber material, and is then allowed to cool slowly. With the solder-glass type of tubesheet materials disclosed in the above cited '490 patent, the final temperature will range from about 375° to about 400° C.

In order to modify the latter step to the practise of the present invention, the following requirements must be met.

A first requirement for a leak-free (helium tight) tubesheet and fiber assembly is an adequate match between the coefficients of thermal expansion of the fiber and tubesheet materials. As a general rule, said coefficients should not differ by more than $20 \times 10^{-7}$ units per °C. Additional requirements for a suitable tubesheet material are: (2) it can be formed as a coherent mass of particles which are sinterable at a temperature well below their glass transition temperature; (3) it can be melted at a temperature below the softening temperature of the fibers; (4) the resultant melt must bond with the fibers; and (5) the sintered particle mass (and fibers) must not conduct heat so efficiently as to render impractical the achievement of localized melting, i.e., melting of just the portion of the sintered mass subjacent to and defining the irradiated tubesheet surface.

The first, third and fourth of the foregoing requirements are implied or specifically disclosed in the prior art descriptions of making hollow fiber/tubesheet assemblies to be used in high temperature battery cells and are not peculiar to the practice of the present invention. However, the second and fifth requirements are novel and are necessarily implied in the preceding definition of the process of said invention.

The heating step (step e) in the foregoing procedure is then modified, according to the present invention, as follows. The assembly comprising the tubesheet and fibers is heated under reduced pressure at a temperature and for a time such that sintering occurs but substantial fusion does not result. Then the upper portion of the sintered particle mass is briefly seared or "broiled" at a temperature which is high enough to cause formation of a fused layer which will effect a tight seal with the fibers when it is allowed to solidify.

The sintering may be carried out in any appropriate fashion. One suitable method is simply to employ a low enough temperature in the second stage of step (e) so that substantial fusion does not occur. Preferably, however, the sintering is accomplished in a single-stage operation in which the assembly is heated (under diffusion pump vacuum, i.e., at $10^{-4}$ to $10^{-7}$ torr) at the latter temperature for a sufficiently long time to ensure that the particles are well joined (edge or point bonded). Thus, the assembly comprising a green-cured tubesheet consisting of particles of sodium borate-type solder glass (4.5 mole % $Na_2O$; 95.5% $B_2O_3$ or 6 mole % $Na_2O$; 94% $B_2O_3$, for example) is maintained at an appropriate temperature (345° or 355°, respectively) for four hours.

Of course, a finite time is required for the assembly to attain the set furnace temperature, but this is advantageous in that any remaining volatiles can be removed before the sintering temperature is reached, thereby avoiding any tendency for foaming to occur (where the material involved in particle bonding becomes relatively plastic).

The fusion step also can be carried out in any appropriate fashion. One method would be to supply the heat utilized in sintering the main portion of the tubesheet through a temperature gradient such that the uppermost portion would be at the required fusion temperature. However, this would be more difficult to control and the preferred method is to cool the sintered assembly and then place it in a suitable housing (such as a pyrex housing, for example), where a graphite disc of about the same diameter as the tubesheet and about 3.2 mm thick (for example) is positioned an appropriate distance (such as about 2 cm, for example) above it on and supported by an intervening, short, vertical VYCOR ® sleeve. The entire assembly is heated to a temperature above the annealing point of the particles (350°-360° C., for example) and maintained under nitrogen (0.1–1 atm.). A radio-frequency induction heating coil is placed around the housing at the level of the graphite disc and used to heat the disc to redness (~700° C.). The heat radiated from the disc melts the adjacent surface layer of the tubesheet, which can be observed through the housing. When the depth and liquidity of the molten layer is judged (by experience) to be sufficient (after 3.5 minutes, for example), the heating is discontinued and the assembly allowed to cool.

Of course, when "broiling" is accomplished in this manner, the fibers usually will not extend substantially above the upper ("second") tubesheet surface and must not extend far enough above it to touch the carbon disk or otherwise detrimentally effect the procedure.

Presumably as a consequence of minute amounts of gas being trapped in the sintered precursor structure, some foaming occurs in the molten layer formed during the latter operation. However, this does not result in a porous structure (as defined earlier herein). That is, the upper layer of the finished tubesheet has the structure of a closed cell foam and is impervious. This is fortunate and somewhat surprising but the present invention of course is not limited to any particular fine structure of the upper layer. All that is necessary is that the layer be non-porous and sealingly engaged with the fibers.

A suitable criterion of non-porosity and effective sealing is the rate at which helium gas will diffuse through the tubesheet (and fiber) structure. In order to determine this rate, the assembly may be placed in a closed vessel connected to a helium supply at one end and to a helium detector at the other end and so adapted that the tubesheet periphery is sealingly engaged with the vessel walls, thereby dividing the vessel into two "tanks"—one above and one below the tubesheet. Since it is difficult to form a removeable seal between the tubesheet and vessel wall which will be itself helium-tight, and to minimize handling of the assembly, a preferable option is to permanently engage the tubesheet edge with the anolyte tank to be incorporated in the finished cell, and to then carry out leak testing. The leak test may be repeated after each fabrication step in which the fiber lengths depending from the tubesheet may be subjected to any stress.

Thus, the foregoing procedure (modified as to step e, as above described) may be continued as follows.

(f) A generally cup-shaped, aluminum or stainless steel tank—which may aptly be characterized as having the shape of an inverted funnel, by reason of comprising a tubular, upward extending section—is prepared for sealing engagement with the tubesheet. The rim of the lower portion of the latter tank is immersed (with or without being preheated) in a body of molten tubesheet glass until the rim is essentially at the temperature (~700° C., for example) of the glass, then carefully withdrawn, together with a thin, adherent layer of the glass, and allowed to cool slowly and evenly.

(g) The assembly of the tubesheet, fibers, mandrel and foil is supported (by the protruding mandrel end) with the tubesheet in a horizontal position and the glass-coated tank rim is positioned in contact with the upper, peripheral surface of the tubesheet. The rim (and the adjacent wall section) of the tank is induction heated by a surrounding, water-cooled coil of copper tubing connected to a source of radio-frequency, alternating current (a Lepel generator, for example). The heating is controlled so that the glass coating on the rim and the portion of the tubesheet in contact with it reaches the sintering temperature of the glass. This temperature is maintained until the rim of the tank has slightly penetrated the tubesheet and then the resulting seal is allowed to cool slowly. The anolyte tank has now been sealed to the tubesheet.

(h) The resulting, augmented assembly is next disposed with the lower peripheral surface of the tubesheet resting loosely on the upper rim of a plastic beaker and the protruding mandrel end connected to a helium conduit extending through the beaker bottom. The assembly is then subjected to a helium leak test to determine whether any fibers have been broken or the seal is imperfect. This is done with a commercial helium detector (a Varian, Model 925-40, mass spectrograph unit which can detect helium flows as small as $10^{-9}$ c.c. (measured at standard conditions) per second). The detector is connected by rubber tubing to the tubular portion (the "funnel stem") of the tank and helium gas is passed through the mandrel and radially outward, between the fibers and across the lower tubesheet face (the beaker being flushed out with helium). If the rate of helium flow through the detector is so low ($<10^{-9}$ c.c./second) as not to be detectable, the assembly is considered leak-free. (A typical helium flow when a leak results from imperfect bonding between the tubesheet and a fiber or from a single broken fiber is about $10^{-2}$ c.c./second.)

If the assembly is helium-tight, it may then be incorporated, without recourse to leak-sealing procedures, in a complete cell, in the manner disclosed in the above identified '868 patent.

It will be recognized that the above-described sintering and fushion ("broiling") steps can be carried out in the same housing and without opening it between the two operations. That is, the spacing sleeve may be supported other than by resting on the tubesheet periphery and the carbon disc introduced before sintering is commenced. After sintering, the induction coil is positioned around the housing and the broiling step is carried out "in situ". It will also be recognized that any other means for producing the radiant heat used to broil the upper tubesheet portion may be employed. That is, the broiling step is not limited to the use of an RF-heated carbon disc.

The following example is for purposes of illustration and is not to be construed as limiting the scope of the present invention in a manner inconsistent with the claims appended hereto.

EXAMPLE

A relatively large number of Na/S battery cells having a nominal rating of 6 ampere hours were made by the abovedescribed prior art procedure before the "bake and broil" method was invented. A comparable number of otherwise essentially identical cells made by the modified procedure of the present invention were compared, as to "tightness" and operating lifetimes with the "prior art" cells. A much higher proportion of gas-tight cells was obtained using the "bake and broil" method of the present invention. Details as to cell components and testing procedures follow.

Each cell comprised a cylindrical, 316 stainless steel casing, 1¼" in outer diameter by 8½" tall, the bottom of which was internally connected to the cathodic current collector (foil roll). The top of the casing was extended, off-center, by a length of stainless steel tubing which served first as a catholyte fill port and was then closed and used as the cathode electrical lead from the cell.

The tubular, upward extending portion of the anode tank extended through a KOVAR ® insulating seal at the center of the casing top and functioned first as a sodium fill port and was then closed and used as the anode lead from the cell.

The fiber/cathode foil/spacer tape/mandrel and tubesheet assembly comprised about 2000 hollow glass fibers, $80\mu$ O.D.$\times 50\mu$ I.D.$\times$about 5" long and a tubesheet disc about 0.2" thick$\times$about 0.96" in diameter. The portion of the fiber (etc.) bundle below the tubesheet was about 0.625" in diameter at the spacer tape level. Most of the space between the bundle and the casing wall was occupied by a 316 stainless steel sleeve which rested on the casing bottom but did not extend up far enough to touch the tubesheet. The cathode foil also did not extend as far as the tubesheet and (molten) catholyte was able to flow from the fill port between the casing wall and anolyte tank, past the tubesheet and into the spaces between the fibers within the bundle, when the cell was charged.

The amounts of catholyte (sulfur) and sodium charged to the cell were about 25 cc and 15 cc, respectively.

The compositions of the fiber and tubesheet glasses were $Na_2O:2B_2O_3:0.2$ NaCl:0.16 $SiO_2$ and 3.9 $Na_2O$:92.9 $B_2O_3$:3.2 $SiO_2$ respectively. (Tubesheets of the latter composition are novel and are the invention of Dr. C. A. Levine, a co-worker of the herein named inventors.) The softening point of the tubesheet glass is much lower than that of the fiber glass but affords a good match thereto in thermal coefficients of expansion.

The fiber, foil, (etc.) bundle was formed around an aluminum tubing length (mandrel) by rolling up on it a length of 0.5 ml thick$\times$4.4" wide aluminum foil on which was disposed a "ladder" of hollow fibers (spaced at 20 per cm) and a length of 5 mil$\times$0.26" wide aluminum spacing tape. The tubesheet material was applied at the nip of the developing roll and adjacent the open ends of the fibers, as a 90% by wt. solids-content slurry, in cumene, of a powder consisting of spherical particles about $40\mu$ in diameter and less regularly shaped, fine particles having effective diameters of about $5\mu$. The resulting tubesheet/fiber (etc.) assembly was pre-dried overnight to remove most of the cumene, and heated in vacuo in such manner that the tubesheet was either fused (the prior art procedure) or sintered and then "broiled" (the present invention).

The majority of the "prior art" cells were made before a helium detector was obtained for leak testing. Prior to that time, a bubble counting device, described below, was used for this purpose. The latter device consists essentially of a pressurized nitrogen gas source, a pressure regulator and two vessels connected in series between the regulator and the cell (the anolyte fill port, conveniently) being tested. The first vessel, A, is relatively large, acts as an essentially constant pressure reservoir and has a side arm which passes in sealing engagement through the wall of the second (smaller) vessel, B, and terminates in a capillary tip which opens just below the surface of a small body of liquid (such as kerosene) at the bottom of B. Nitrogen is charged through a valve to pre-purged vessels A and B (through A) until a preselected pressure (5 psig) is attained therein. The valve is then closed. If any nitrogen passes out of B through the tubesheet/fiber assembly, it is replaced by a corresponding amount of nitrogen from A, which is seen as bubbles emerging from the capillary tip. Unless the leak is large, no significant change in the $\Delta P$ occurs during the short period of time required to determine the bubble rate.

The dimensions of the capillary are such that, at a $\Delta P$ of 5 psig, twenty bubbles are formed per cc of nitrogen gas passed. Thus, a bubble rate of 1 bubble per minute (at 5 psig) is equivalent to 1/20 (0.05) cc of nitrogen per minute. This is about the rate attributable to a single broken fiber (or an equivalent leak through the tubesheet or along a tubesheet-fiber contact surface). The completed cells designated herein as "prior art" cells were considered acceptable if their observed leak rates were not greater than 0.5 bubble per minute (one $N_2$ bubble every two minutes); equivalent to about $0.4\times 10^{-2}$ cc of helium per second, at a $\Delta P$ of 1 atmosphere (@25° C.).

None of the "prior art" cells tested with the helium detector were "helium-tight" (passed less than $10^{-9}$ cc/sec of helium). Even those cells which were acceptable by the bubble rate criterion exhibited relatively short lifetimes (up to about 21 days maximum, when repeatedly subjected to deep charge/discharge cycles in a standard testing protocol).

Dramatic improvements in acceptance rates and operating lifetime resulted when the tubesheet curing procedure was modified according to the present invention. A high proportion (7 out of a total of about 10) tubesheet/fiber (etc.) assemblies were helium-tight as formed. Of these, about 50% survived the stressing inherent in the cell assembly procedure and gave helium-tight cells. The operating lifetimes of the latter cells ranged up to as high as 131 days, and post-mortem of the failed cells showed that failures were generally not due to anolyte/catholyte contact resulting from leaks.

What is claimed is:

1. A process for making a helium-tight, tubesheet/hollow fiber assembly comprising a ceramic tubesheet which has first and second generally opposed faces and is pierced by a plurality of inorganic hollow fibers having closed-ended sections extending from said first face and open ends terminating in or beyond said second face, the portion of said tubesheet subjacent to and defining said second face being non-porous and sealingly engaged with the fibers, the remainder of the tubesheet being contiguous with said portion but not itself sealingly engaged with the fibers, and consisting essentially of sintered, ceramic particles having the same chemical composition as said portion;

said process comprising:

(a) providing a self-supporting, sintered, ceramic particle mass which has two generally opposed surfaces and is pierced by and adhered to said fibers, the closed-ended sections of which extend from one of said surfaces and the open ends of which terminate in or beyond said other surface, the particles constituting said mass consisting of a material which (1) has a coefficient of thermal expansion not differing from the coefficient for the fiber material by more than $20\times 10^{-7}$ per °C., (2) is fusible, at a temperature below the softening point of the fibers, to a melt capable of bonding with them, and (3) has a sufficiently low thermal conductivity so that the portion of said mass subjacent to and defining said other surface can be locally heated to said temperature and melted without causing the rest of said mass to lose its sintered, particulate structure, (b) so heating to said temperature said portion of said mass, and (c) cooling the so-heated mass to solidify the resulting layer of molten ceramic, thereby forming said helium-tight assembly.

2. The process of claim 1 in which said sintered particle mass is provided by:

(1) slurrying said ceramic particles with a volatile organic solvent, the size, distribution and shapes of said particles, their relative proportion in the slurry and the natures of the solvent and the particle surfaces being such that the slurry is a paste capable of maintaining the shape of a disc when formed as such, (2) disposing said slurry as a disc-shaped body of paste, pierced by said fibers, (3) evaporating said solvent from said body, and (4) heating the solvent-depleted body at a temperature below the softening point of said fibers for a period of time such that said particles are converted to said sintered particle mass.

3. The process of claim 1 in which said fibers are fragile.

4. The process of claim 3 in which said fibers are composed of an alkali-metal cation-conductive ceramic and said tubesheet is electronically non-conductive.

5. The process of claim 1 in which the portion of said mass subjacent to and defining said second surface is melted by heat radiated directly to it from a graphite disc heated to redness.

6. The process of claim 4 in which the portion of said mass subjacent to and defining said second surface is melted by heat radiated directly from a graphite disc heated to redness by means of a radio-frequency, alternating current, induction coil.

* * * * *